US007562358B2

(12) United States Patent
Bennett et al.

(10) Patent No.: US 7,562,358 B2
(45) Date of Patent: Jul. 14, 2009

(54) CONTROLLED DEPLOYMENT OF SOFTWARE IN A WEB-BASED ARCHITECTURE

(75) Inventors: David A Bennett, Bothell, WA (US); Paul A. Bilibin, Lynnwood, WA (US); Mark A. Bjerke, Bellevue, WA (US); Lynn S. Goldhaber, Renton, WA (US); Hsiangwen S. Hu, Redmond, WA (US); Lory E. Krett, Bremerton, WA (US); Jinyue Liu, Sammamish, WA (US); Paul R. McLaughlin, Sammamish, WA (US); Reichie R. Nelson, Everret, WA (US); Charles D. Mentzer, Sammamish, WA (US); Matthew J. Smith, Redmond, WA (US); William W. Smith, III, Medina, WA (US); Harland F. Maier, Redmond, WA (US); Geoffrey Carl McGrath, Seattle, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 716 days.

(21) Appl. No.: 11/238,423

(22) Filed: Sep. 28, 2005

(65) Prior Publication Data

US 2006/0075398 A1 Apr. 6, 2006

Related U.S. Application Data

(60) Provisional application No. 60/616,063, filed on Oct. 4, 2004.

(51) Int. Cl.
*G06F 9/44* (2006.01)

(52) U.S. Cl. .................. 717/170; 717/168; 717/177; 709/220

(58) Field of Classification Search ......... 717/168–178, 717/100, 122, 107, 158; 709/220
See application file for complete search history.

(56) References Cited

U.S. PATENT DOCUMENTS

| 5,583,983 | A  | * | 12/1996 | Schmitter ............... 717/138 |
| 5,689,708 | A  | * | 11/1997 | Regnier et al. .......... 709/229 |
| 6,389,589 | B1 | * | 5/2002  | Mishra et al. ........... 717/170 |
| 6,850,980 | B1 | * | 2/2005  | Gourlay ................. 709/226 |
| 6,973,647 | B2 | * | 12/2005 | Crudele et al. .......... 717/177 |

(Continued)

OTHER PUBLICATIONS

Indoor FDD multi-operator deployment, Gatzoulis, L.; Povey, G.; Band, I.; wilson, D.; iEEE, 2003 pp. 37-41.*

(Continued)

*Primary Examiner*—Wei Y Zhen
*Assistant Examiner*—Satish Rampuria
(74) *Attorney, Agent, or Firm*—Alston & Bird, LLP

(57) ABSTRACT

The present invention includes systems and methods for the controlled deployment of software in a web-based environment where multiple versions of a single application are supported to provide field experience of various versions before general deployment. The systems and methods of the invention support backwards compatibility, which allows older versions of the same software to be accessed concurrently with newer (revised) versions. Likewise, data item opaqueness is supported whereby data items not recognized by a software level or tier are not rejected but are passed on to another tier or level where they may be recognized.

18 Claims, 9 Drawing Sheets

U.S. PATENT DOCUMENTS

| | | | |
|---|---|---|---|
| 7,032,229 B1 * | 4/2006 | Flores et al. | 719/328 |
| 7,073,164 B1 * | 7/2006 | Knowles | 717/102 |
| 2004/0168153 A1 * | 8/2004 | Marvin | 717/120 |

OTHER PUBLICATIONS

Using version control data to evaluate the impact of software tools: a case study of the Version Editor, Atkins, D.L.; Ball, T.; Graves, T.L.; Mockus, A.; IEEE, vol. 28, Issue 7, 2002 pp. 625-637.*

Generating diverse software versions with genetic programming: an experimental study, Feldt, R.; IEEE, vol. 145, Issue 6, Dec. 1998 pp. 387-394.*

Van Der Hoek, A.; Configurable software architecture in support of configuration management and software deployment; 1999; pp. 732-733.*

Coupaye, T.; Estublier, J.; Foundations of enterprise software deployment; 2000 pp. 1-9.*

Unicenter Software Delivery release 4.0; Accessed in may of 2004; 12 pages; http://www3.ca.com/Solutions/Products.asp?ID=234. Applicants make no admission that this reference constitutes prior art.

Jim Plas; Microsoft Business Solutions Practice—A Deployment Perspective; Issue 3 2000; pp. 1-9; http://www1.us.dell.com/content/topics/global.aspx/power/en/ps3q00_plas?c=us&cs=555&1=en&s=bix. Applicants make no admission that this reference constitutes prior art.

Eisenhauer G et al: "Fast Heterogeneous Binary Data Interchange"; Heterogeneous Computing Workshop, 2000. (HCW 2000). Proceedings. $9^{th}$ Cancun, Mexico May 1, 2000, Los alamitos, CA, USA, IEEE Comput. Soc, US, 2000, pp. 90-101, XP010500181; ISNB 0-7695-0556-2; p. 91, section 2 "The PBIO Communication Library".

International Search Report from International Application No. PCT/US2005/034934 dated Sep. 29, 2005.

* cited by examiner

SWITCH THAT DETECTS THE VERSION

INPUTS AND OUTPUTS TRANSLATED TO THE DESIRED VERSION

CONTROLLED DEPLOYMENT OF SOFTWARE IN A WEB-BASED ARCHITECTURE

CROSS-REFERENCE TO RELATED APPLICATION

This application claims the benefit of U.S. Provisional Application No. 60/616,063, filed Oct. 4, 2004, which is incorporated herein in its entirety.

BACKGROUND OF THE INVENTION

1. Field of the Invention

The present invention generally relates to computer systems and software and particularly relates to computer systems having web-based architecture and the deployment of software associated with such systems.

2. Description of Related Art

Presently, carrier management systems (CMS) allow users to ship packages through one or more carriers. CMS assist the user in choosing a carrier based on cost, efficiency or other characteristics. Typical users may be, for instance, corporations or business entities having shipping departments and retail shipping facilities such as Mail Boxes Etc./The UPS Store, Kinko's, Staples, etc. Generally, a typical shipping location will have one or more user terminals that access a CMS data center over a network. In typical CMS applications, rating data and other carrier specific information is generally maintained only at the CMS data center to facilitate updates/changes and minimize duplication.

In many instances CMS software is upgraded, modified, revised, replaced or otherwise changed. This may occur on either a relatively frequent basis or only occasionally. If such changes are not compatible with a user's software or systems, the change can be detrimental to the user. Furthermore, in some instances, the user may not desire to use the changed software as it may affect their business rules or be associated with additional costs and, in some instances, those managing the CMS software may desire that only a limited number of users have access to the changed software.

Therefore, a challenge faced by present CMS and other web-based software is the upgrade or change of such software without substantially or inadvertently affecting the users of the system.

BRIEF SUMMARY OF THE INVENTION

The embodiments of the present invention provide systems and methods of controlling the deployment of software in a multiple version environment and providing field experience before general deployment.

One aspect of the invention is a system and method for allowing a controlled environment to support backward compatibly of software. There are multiple methods to implement the controlled deployment dependent upon the detected version. In one embodiment, the system and method use a plurality of attributes that can be used to determine at the time of access to a data center as to which version(s) of software to present to an end user.

Another aspect of the invention is a method and system that utilizes data item opaqueness thereby passing data on un-interpreted and preserving backward compatibility.

Yet another aspect of the invention is the use of a plurality of methods to maintain variable argument lists for stored procedures.

Another aspect of the invention is a system and method that maintains consistent semantics when accessing a shared database through multiple versions of the same software and not removing allowed values for items from databases.

Another aspect of the invention is systems and methods of introducing a new data item to shared databases that are accessed by multiple versions of the same software.

Yet another aspect of the invention are systems and methods of allowing for multiple versioning of the same software operating on the server(s) of a data center and methods for maintaining and adding the version number scheme. Furthermore, in situations where the versioning is not enough to handle all compatibility issues, another aspect of the invention is the additional method of the addition of a multiple character fixed width string application identifier.

Another aspect of the invention is a system and method that versions web content via version number embedded in a URL, query string, separate beta domain or cookie. This is not meant to exclude other means for control and availability of various versions of application version specific web content.

Yet another aspect of the invention is a method that uses versioning of stored procedures by using a version number and application string to provide the appropriate data access.

Another aspect of the invention is a method that uses versioning of view names.

Yet another aspect of the invention is a method that uses message queues to handle different versions of the same message.

Another aspect of the invention is a method and system for controlling the deployment of carrier management software in a multiple version environment in a web-based system and providing field experience before general deployment.

Another aspect of the invention is a system for controlling the deployment of software in a multiple version environment. The system is comprised of one or more servers simultaneously executing at least a first and a second version of a particular software application and one or more user terminals that access the one or more servers over a network. A request is made to access the particular software application from one of the user terminals and the request identifies the version of the particular software application to be accessed. The system is further comprised of a device for routing the request to the version of the particular software application to be accessed.

Yet another aspect of the present invention is a system for controlling the deployment of software in a multiple version environment. The system includes one or more servers simultaneously executing at least a first and a second version of a particular software application, and one or more user terminals that access the one or more servers over a network. A request is made to access the particular software application from one of the user terminals and the request has means for identifying the version of the particular software application to be accessed. The system is further comprised of means for routing the request to the version of the particular software application to be accessed.

Another aspect of the invention is a system for simultaneously executing multiple tiers of software in a multiple version environment. The system is comprised of one or more servers simultaneously executing at least first and second versions of a particular software application. The first and second versions of the particular software application comprise the multiple tiers of software. The system further includes one or more user terminals that access the one or more servers over a network so that a request comprised of at least one of variables, data items or arguments is made to access the particular software application from one of the user terminals and the request identifies the version of the particular software application to be accessed. A device for routing said request to the version of the particular software application to be accessed is also included in the system such that the variables, data items, or arguments of the request are passed from a tier of software where they are not recognized to a tier of software where the variables, data items, or arguments are recognized by the version of the particular software application executing at that tier of software.

Yet another aspect of the present invention is a method of controlling the deployment of software in a multiple version environment. The method comprises the steps of providing one or more servers simultaneously executing at least a first and a second version of a particular software application, and providing a user terminal wherein a user logs onto a website using the user terminal and assigned logon information. A next step is determining from the logon information a designated version of the particular software application for the user, where such designated version of the particular software application is the version of the particular software application that the user is authorized to access. The next step is making a request from the user terminal over a network to the one or more servers to access the designated version of software, where the request identifies the designated version of the particular software application to be accessed. Then, the designated version of the particular software application is accessed.

Another aspect of the present invention is a method for simultaneously executing multiple tiers of software in a multiple version environment. This method is comprised of the steps of providing one or more servers that are simultaneously executing at least first and second versions of a particular software application, where the first and second versions of the particular software application comprise the multiple tiers of software. Then, providing one or more user terminals that access the one or more servers over a network. Next, a request is made that is comprised of at least one of variables, data items or arguments to access the particular software application from one of the user terminals. The request identifies the version of the particular software application to be accessed. The request is routed to the version of the particular software application to be accessed, where the variables, data items, or arguments of the request are passed from a tier of software where they are not recognized to a tier of software where the variables, data items, or arguments are recognized by the version of the particular software application executing at that tier of software.

These and other aspects of the invention are described in greater detail in the drawings and description herein.

BRIEF DESCRIPTION OF THE SEVERAL VIEWS OF THE DRAWINGS

Figure 1:
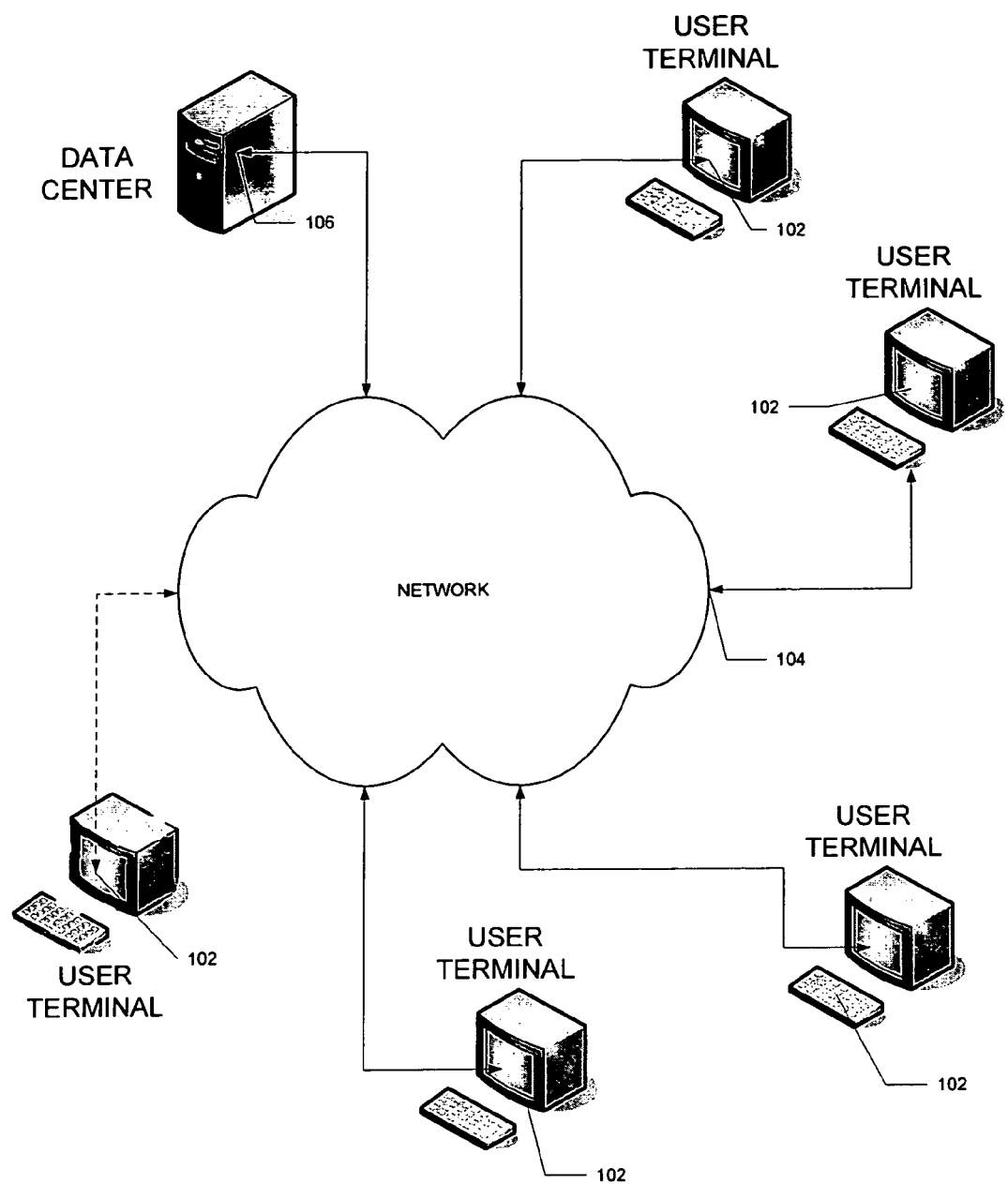
Figure 2:
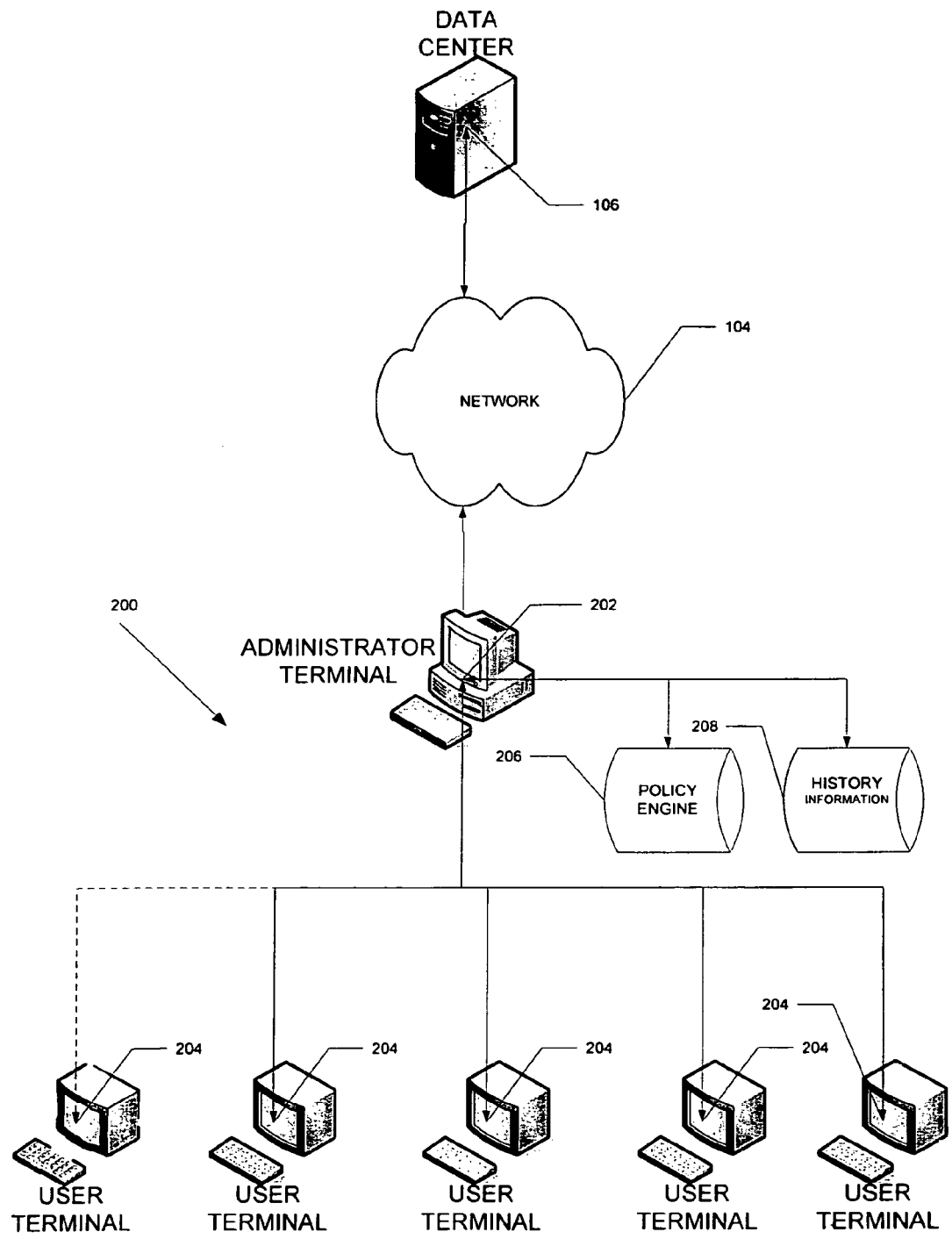
Figure 3A:
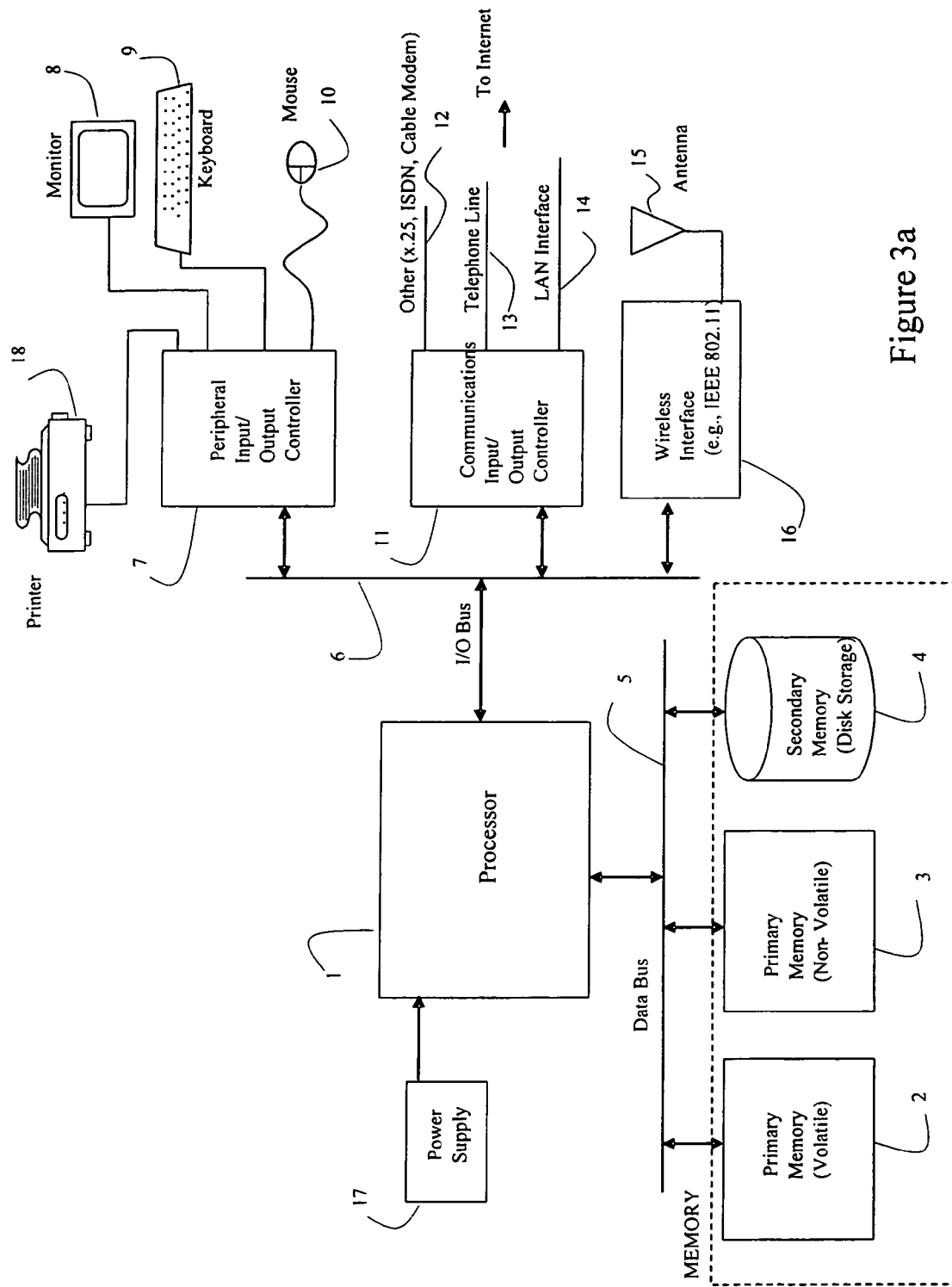
Figure 3B:
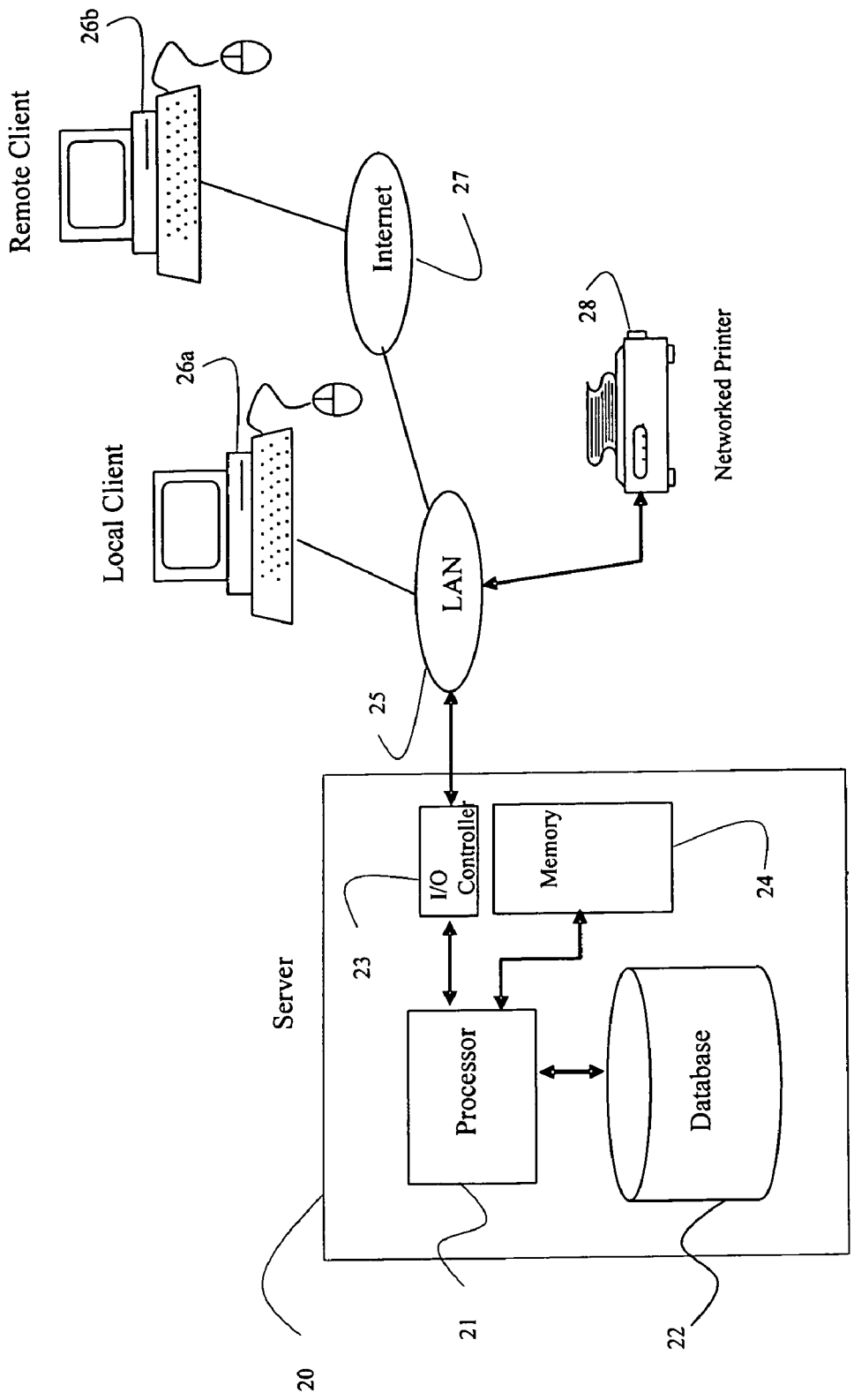
Figure 4:
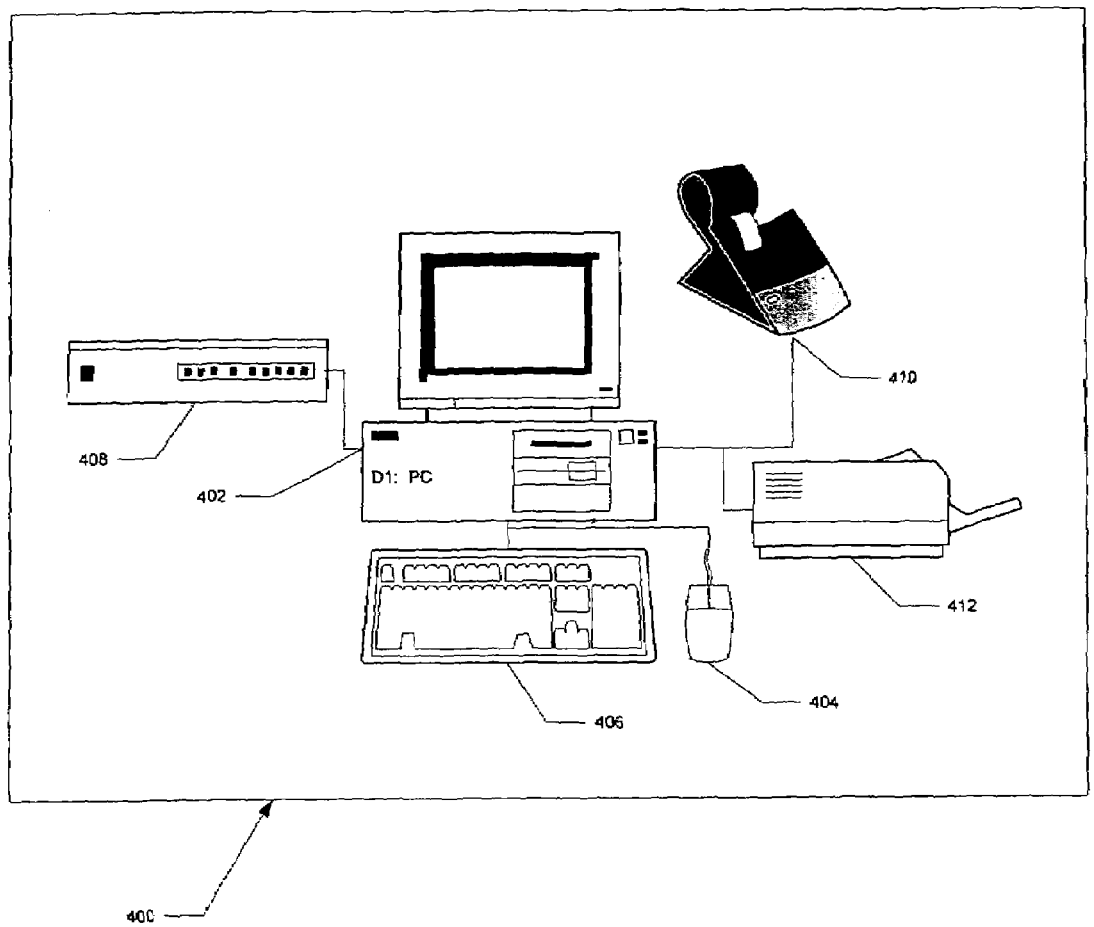
Figure 5:
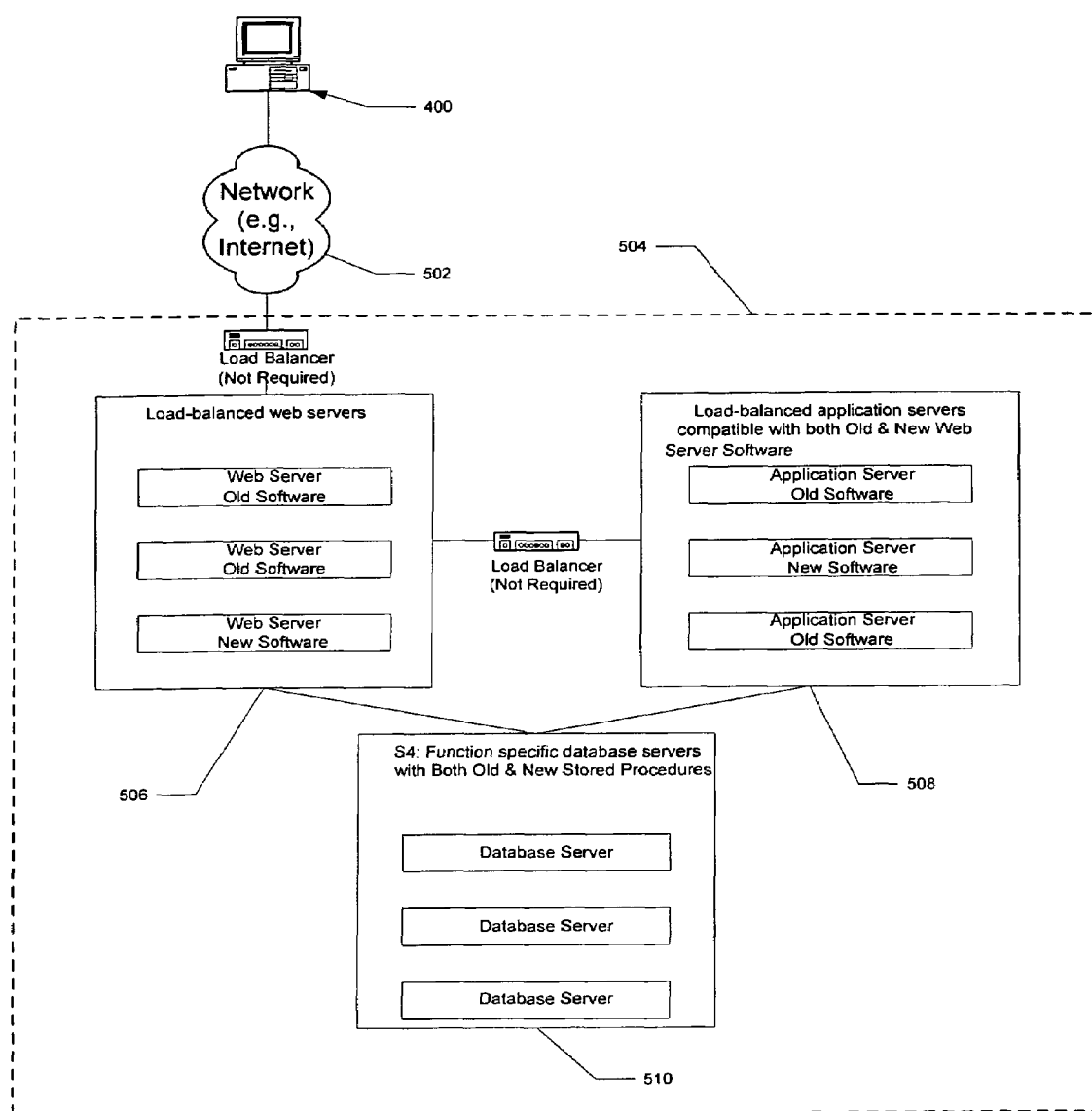
Figure 6A:
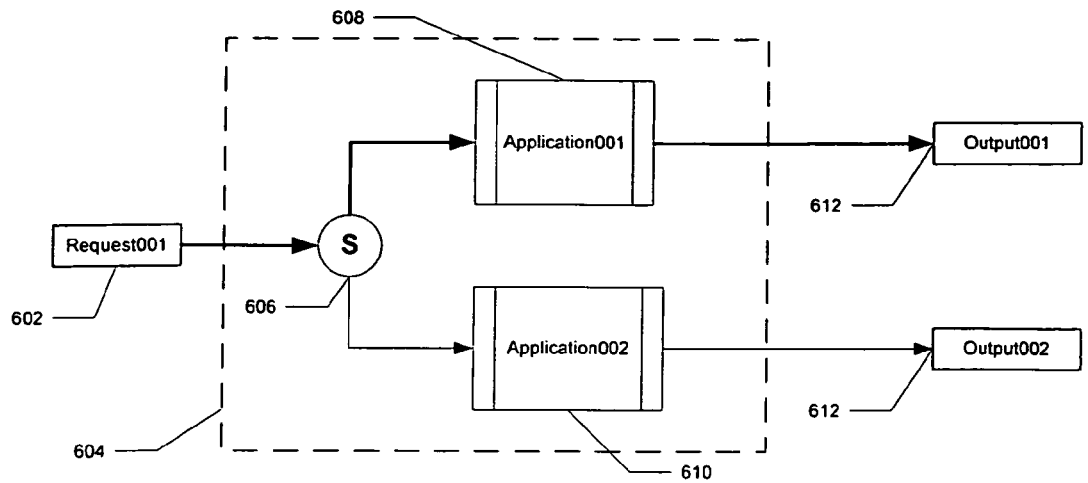
Figure 6B:
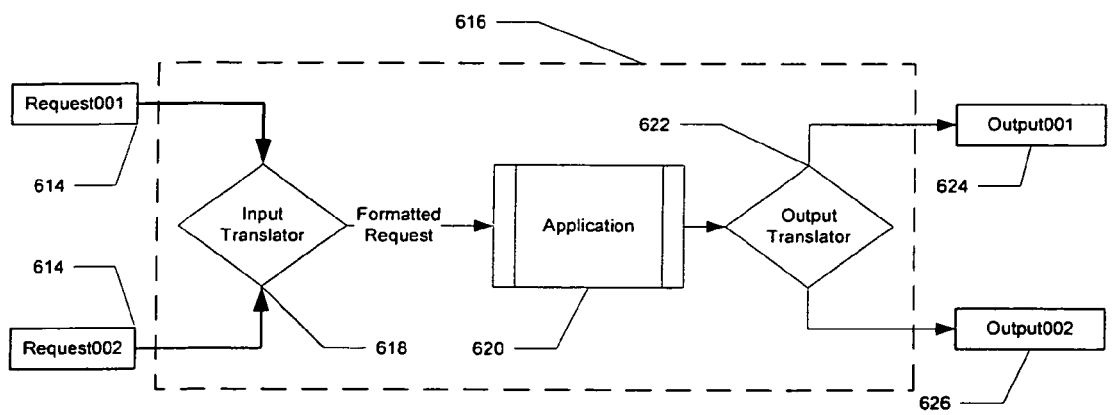
Figure 7:
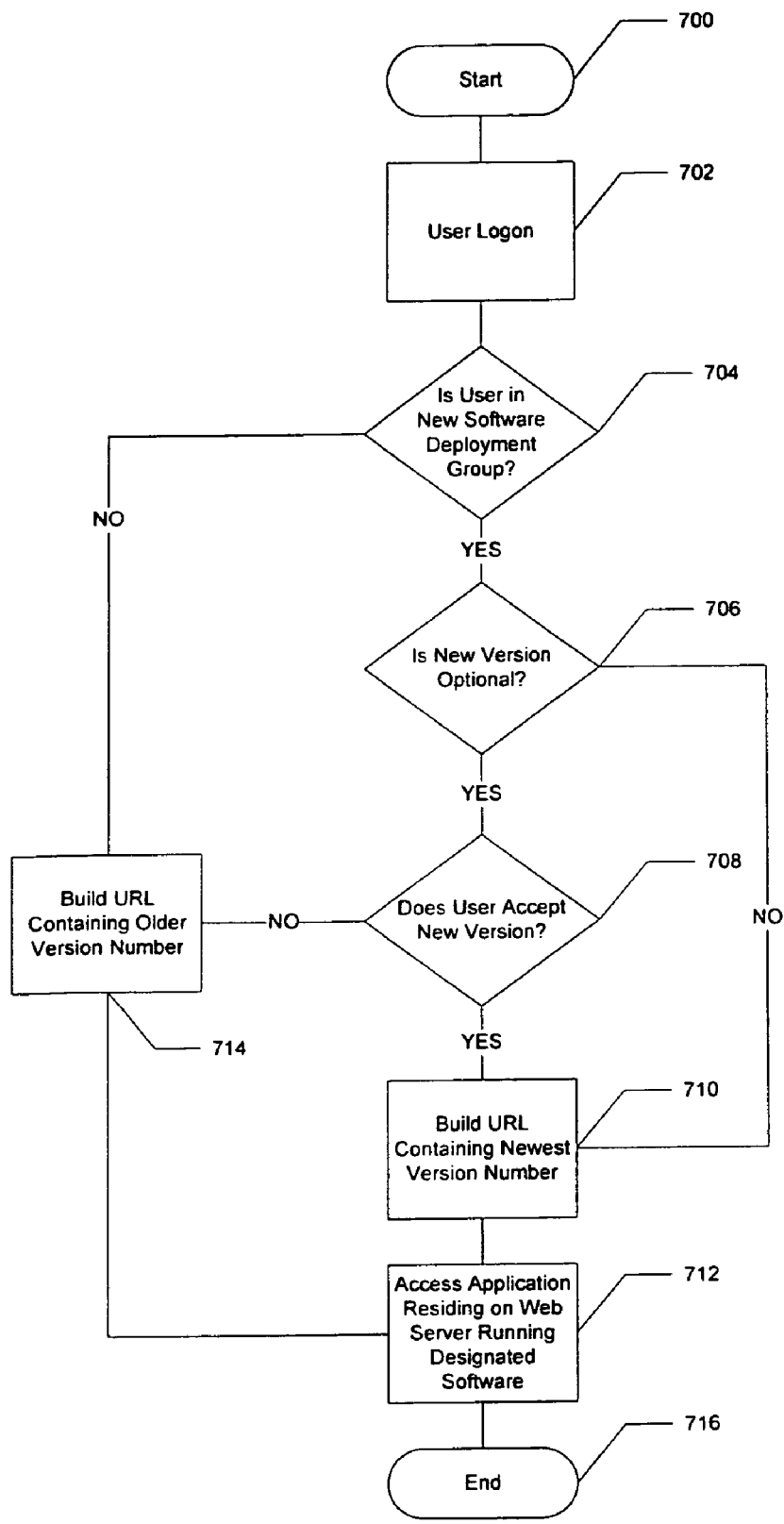
Figure 8:
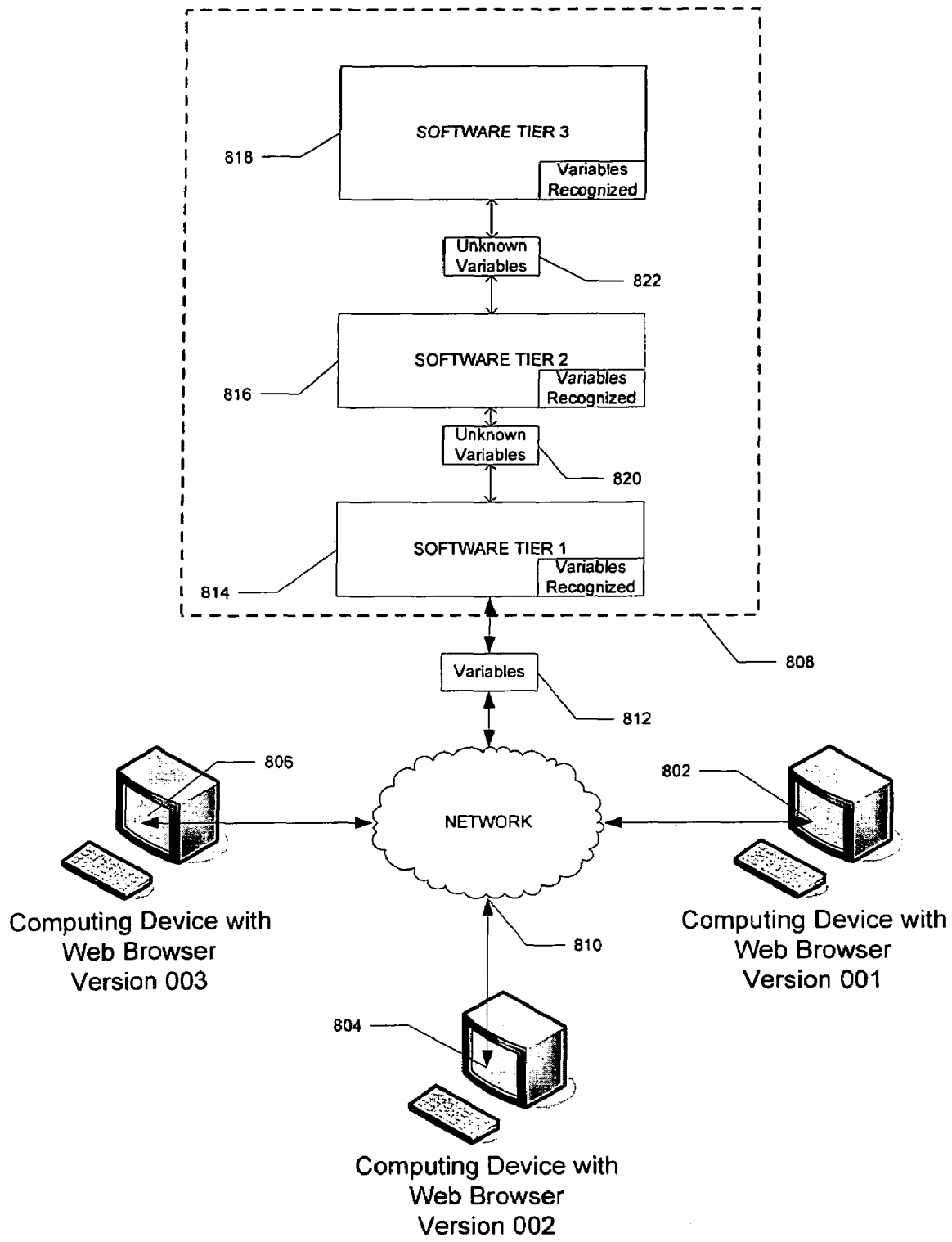

Having thus described the invention in general terms, reference will now be made to the accompanying drawings, which are not necessarily drawn to scale, and wherein:

FIG. 1 is an exemplary system for implementation of a computerized system such as, for example, a carrier management system (CMS) comprised of one or more user terminals or shipping stations (generally, clients) that are connected over a network to one or more servers that function as a data center, that may be used to practice one or more aspects of the invention;

FIG. 2 is an exemplary shipping location comprised of one or more user terminals and an administrator's station that are connected to a data center over a network that may be used to practice one or more aspects of the present invention;

FIG. 3a is an illustration of one embodiment of a computer that can be used to practice aspects of the present invention;

FIG. 3b is an embodiment of a processing system having a distributed communication and processing architecture that may be used to practice aspects of the present invention;

FIG. 4 is an illustration of a typical user terminal that may be used in one or more embodiments of the present invention;

FIG. 5 is an illustration of a user terminal such as that shown in FIG. 4, which may be connected over a network to a data center, wherein the data center is comprised of one or more web servers, one or more application servers, and one or more database servers, in an embodiment of the invention;

FIGS. 6A and 6B illustrate means for routing a request for access to a specific version of software code to the version requested, in embodiments of the present invention;

FIG. 7 is a flowchart of a process of for controlled deployment of software in a web-based Internet environment in an embodiment of the invention; and FIG. 8 is an exemplary system for implementing an embodiment of the invention that illustrates the inventive concepts of backwards compatibility and data item opaqueness.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers, if referenced herein, refer to like elements throughout.

The present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various entities provide carrier management systems for shipping parcels. Carrier management systems are generally network-delivered, multi-carrier shipping management systems that allow rate/service comparisons of various carriers, generate mailing/shipping labels and collect and arrange data. Although there are several different configurations and operating mechanisms for these systems, a basic configuration is shown in FIG. 1, which generally consists of one or more user terminals 102 or shipping stations (generally clients) that are connected over a network 104 to one or more servers that function as a data center 106. Generally, a user terminal 102 utilizes browser-based software to access a data center 106 over the Internet. The data center 106 contains rating and/or shipping information for one or more carriers. However, software other than browsers and networks other than the Internet may be used in the embodiments of this invention.

A user at a user terminal 102 may enter certain information about a parcel to be shipped such as, for example, the parcel's weight, dimensions, destination, shipper, desired class of service (ground, overnight air, etc.), etc. Furthermore, certain business rules of the entity operating or controlling the user terminal 102 may be applied. Information may be entered into the user terminal 102 in a multitude of ways such as, for example, by the use of scales, scanners, keyboards, etc. Once some amount of information has been received by the user terminal 102, the user terminal 102 will access the data center 106 over the network 104 for rating information and shipping information for various carriers that are participating in the carrier management system. This rating and shipping information will then be presented to a shipper and the shipper may decide which carrier to use based on the presented information. In this manner the shipper may be presented with various carrier options for shipping the parcel and may choose the one that best meets the shipper's needs and/or budget.

The above-described architecture is used in a number of computer hardware and software configurations, not just with carrier management systems; however, the carrier management system configuration will be utilized throughout this application for exemplary purposes and not for purposes of limitation.

A shipping location 200 may be comprised of one or more user terminals. For instance, a shipping location as shown in FIG. 2 may be comprised of an administrator's station 202 and one or more shipping stations 204. While the administrator station 202 and the shipping stations 204 may serve as user terminals for conducting shipping business, the administrator station manages 204 shipping activities across the shipping location (a/k/a enterprise). For instance, the administrator station 204 may contain, in some embodiments, a policy engine 206 that can specify business rules and procedures for all shipping stations associated with the enterprise. In the process of entering and shipping information and printing labels, the policy engine 206 can automatically create compliance with key policies and track compliance with the enterprise's business rules. The administrator station 202 may also be used to collect a history of the enterprise's shipping transactions. This history information 208 may be used create a number of shipping reports, including shipping activity by location, shipping activity by carrier, shipping activity by department, shipping activity by cost center, etc.

Various carrier management systems have been patented or have patent applications pending. For instance, U.S. Pat. No. 5,631,827; issued to Nicholls et al. on May 20, 1997 and U.S. Pat. No. 5,485,369 issued to Nicholls et al. on Jan. 16, 1996; both fully incorporated herein and made a part hereof, describe one such carrier management system. Another such carrier management system is described in U.S. patent application Ser. No. 09/684,869; filed on Oct. 6, 2000; and U.S. patent application Ser. No. 09/684,865; also filed on Oct. 6, 2000; and U.S. patent application Ser. No. 09/820,377; filed on Mar. 27, 2001 and published as U.S. patent application Publication No. 20020032573 on Mar. 14, 2002; each fully incorporated herein and made a part hereof.

Because of the architecture of these carrier management systems, the release or deployment of new or revised server-based applications may be problematic. The embodiments of the present invention allow a specific version or release of an application or software system to be accessed via a web server. This is accomplished by website software recognizing a user and directing that user to a web server that is operating the version or release of software that is designated for that user. In this manner, upgrades, revisions, or new releases of web-based software may be deployed in a controlled manner and various users of such systems may have access to various releases or versions of software through the same website. Therefore, the embodiments of the present invention overcome the challenges caused when software is added, modified, revised, updated or removed in a web-based architecture where access to the software is facilitated through one or more websites.

In several of the embodiments of the invention referenced herein, a "computer" or user station is referenced. The computer or user station may be, for example, a mainframe, desktop, notebook or laptop, hand-held, hand held device such as a data acquisition and storage device, etc. In some instances the computer may be a "dumb" terminal used to access data or processors over a network. Turning to FIG. 3a, one embodiment of a computer is illustrated that can be used to practice aspects of the present invention. In FIG. 3a, a processor 1, such as a microprocessor, is used to execute software instructions for carrying out the defined steps. The processor receives power from a power supply 17 that also provide power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

An alternative embodiment of a processing system that may be used is shown in FIG. 3b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the principles of the present invention. The embodiments illustrated in FIGS. 3a and 3b can be modified in different ways and be within the scope of the present invention as claimed.

A typical user terminal that may be used in one or more embodiments of the present invention is shown in FIG. 4. The embodiment of a user terminal 400 of FIG. 4 is comprised of a personal computer 402 having a mouse 404 and a keyboard 406. Also included in this particular embodiment is a scale 408 for weighing parcels and a barcode label printer 410 for printing mailing/shipping labels. This user terminal 400 also includes a report printer 412, though the report printer 412 is not required to practice the invention.

As shown in FIG. 5, a user terminal 400 such as that shown in FIG. 4 may be connected over a network 502 to a data center 504. The data center 504 in the embodiment shown in FIG. 5 is comprised of one or more web servers 506, one or more application servers 508, and one or more database servers 510, though there are numerous other possible configurations for data centers. In one exemplary employment of the present invention, a carrier management system (CMS) having one or more user terminals accesses a data center to prepare parcels for shipment by a carrier.

The embodiments of the present invention comprise a method and a system for controlling the deployment of software in a multiple version environment and providing field experience of one or more specific versions of the software for certain users before general deployment. The embodiments of the present invention allow for a controlled environment to supports backward compatibly.

Aspects of the embodiments of the invention include multiple version support; data item opaqueness and backwards compatibility such that variables and data items not recognized by a tier of the software are passed on un-interpreted to the next tier; and multiple methods of directing a user to their designated version of software. These and other aspects of the invention are more fully described herein.

Software Tiers and Data Interpretation

The system and method of the present invention utilizes data item opaqueness whereby certain data is passed un-interpreted through various tiers of software and backward compatibility is preserved for compatibility with earlier software versions. The tiers of software may be various versions of the same application.

The embodiments of the present invention use a plurality of methods to maintain variable argument lists for stored procedures and applications. For instance, the system and method maintains consistent data variable semantics and generally does not remove allowed values for items in order to maintain backwards compatibility. Rather than removing allowed values for data items, new data items are introduced and data items that are not recognized or understood are ignored.

Versioning

The embodiments of the present invention allow for multiple versioning of software and a method for maintaining and adding the version number in a version numbering scheme. In one embodiment, in situations where multiple versioning is not enough to handle all compatibility issues, the system utilizes a method that includes the addition of a multiple character fixed width string application identifier in addition to the version numbering scheme.

The system and methods of the present invention also versions web content comprised of applications, interfaces, graphics, etc. accessible through a browser over the Internet via a version number embedded in a URL, query string, separate beta domain or a cookie. This is not meant to exclude other means for control and availability of various versions of application version specific web content.

The method uses versioning of stored procedures by using a version number and/or an application string to provide access to the appropriate data for a user. View names are also versioned and version-specific message queues are used to handle different versions of the same message.

System Wide Requirements

Multiple Version Support

The embodiments of this invention provide support for the execution and access to multiple versions of a software product at the same time. One embodiment of the present invention comprises multiple versions of a web site accessible via the Internet through a browser, which allows the ability to have a true beta version of the software used in production and allows users to get real field experience with a release before it is widely deployed. The ability to simultaneously run and/or access multiple versions of software provides programmers and those implementing and/or administering the software time to detect and correct defects that weren't caught in the upgrade process or differences in client side operating system/browser/peripheral configurations. The sections below describe in greater detail the software and hardware modifications to each software tier/layer that will support multiple versioning.

Backwards Compatibility

The embodiments of this invention support backwards compatibility such that software code is able to work with the latest version and with at least the immediately previous version. Generally, this is accomplished by layers or tiers of software, each a different version, executing simultaneously on one or more servers. FIGS. 6A and 6B illustrate means for routing a request for access to a specific version of software code to the version requested, in embodiments of the present invention. As shown in FIG. 6A, in one embodiment, a request 602 is sent to a data center 604 having one or more servers that are simultaneously executing multiple versions of software (e.g., Application001 608 and Application002 610). A switch 606, which may be a software switch, a hardware switch, or a combination of software and hardware, detects from some identifier either in, or associated with, the request 602 the software version of the request 602. Based on the version of software detected from the request 602, the request 602 is routed to the appropriate version of the software 608, 610 that is executing on the servers associated with the data center 604. For instance, in FIG. 6A a request 602 is made to the data center 604 for functionality that is associated with Application001 608. The request 602 arrives at a switch 606. Hardware and/or software associated with the switch 606 determine the functionality sought by the request 602 and route the request 602 to the appropriate application 608, 610 depending upon the functionality sought. For example, in FIG. 6A the request 602 seeks functionality associated with Application001 608 and routes the request 602 accordingly. Upon processing the request 602, the chosen application 608 may create an output 612 based on the nature of the request 602. Note that in FIG. 6A, applications Application001 608 and Application002 610 may be simultaneously executing as layered tiers of software on the same server.

In the embodiment illustrated in FIG. 6B, a request 614 sent to a data center 616 is received by an input translator 618. The input translator 618 may be comprised of one or more software applications, hardware or combinations thereof. The input translator 618 then formats the request into a format that is executable on the application 620, regardless of the version of the request 614. For instance, in FIG. 6B one request 614 is shown as being for version 001 of the software and a second version is shown as a request 614 for version 002 of the software. The formatted request is then transferred from the input translator 618 to the application 620 and executed. The output of the application 622 is transferred to an output translator 622. The output translator 622 may be comprised of one or more software applications, hardware, or combinations thereof. The output translator 622 then formats the output of the application 620 to a format that corresponds to the request 614. For instance, in the embodiment of FIG. 6B, the output translator 622 formats the output to either version 001 624 or version 002 626, depending upon the version of the request 614. It is to be noted in both FIGS. 6A and 6B that the version of the request 602, 614 depends on the version of the CMS software that is being operated by the requestor.

Data Item Opaqueness

In the embodiments of the invention, software tiers executing simultaneously on the same server or groups of servers ignore data items that aren't recognized or used by a particular tier and pass the data items on opaquely (un-interpreted) to the next layer or tier. Generally, in order to maintain backwards compatibility, data items are not removed, but new data items are added for changes in later versions of a software implementation. This allows new data items that are unknown or unrecognized to certain software tiers to be passed on to a software layer or tier that is executing a new or different version of the software so that the data items may be used by new or different version of the application. Stored procedures that are used by the various tiers of software applications are accessed via variable length argument lists.

Semantics

Semantics, as used herein, refers to the use of variable names and names for argument lists and data items. The use of inconsistent semantics is detrimental to backward compatibility. Generally, in the embodiments of this invention, new data items are introduced and/or allowed values for data items are added in order to maintain backwards compatibility rather than changing semantics. Furthermore, allowed values for data items are supported in all (new and older) versions of software. The addition of new data items and maintaining support for data values is related to the continuity of semantics. New allowed values for data items are selectively and cautiously added. If excessive data items and/or data values are indiscriminately allowed then database joins and queries may fail to account for new values thus resulting in missing data.

Alternatives to Software Versioning

While the release of new versions of software is acceptable and supported by the embodiments of the invention, in many instances it may be more convenient and/or practicable to utilize backwards compatibility without a version number for small releases that involve nominally minimal changes in order to avoid excessive versioning.

Version Number Definition

The embodiments of the present invention employ a software version number scheme. The software versioning schemes employed by the embodiments of the present invention are intended to be reasonably efficient and not use excessive bytes since a version identifier may be sent in every request from web applications accessing the software tiers. Software versioning is not intended to replace more complex build and product versions of software. For example, for the purposes of controlled deployment, a separate version number (for controlled deployment versioning) is used from the version number the application user can see using the CMS application's "About" dialog box. It is typical software industry practice to have versions numbers of the form <major version>.<minor version>. For example a version number "3.1" means the major product version is 3 and the minor version number is 1. An application may have a general version number of 3.1, yet have a controlled deployment version of "002." Regardless of context, controlled deployment version numbers, in one embodiment, are represented by a fixed width zero left padded 3-position string such as, for example, 001 or 099. Generally, the first version number is the string 001 for the first release of software and will be the version number for all code associated with the first release. Subsequent versions are sequentially incremented (e.g., 001, 002, 003, etc.). If a version number were to reach 999, the next version number will start back at 001.

A version number of NULL or an empty string, (e.g., ' '), may be used to represent the version of the data center prior to the release of the first (modified or updated) version. Arguments and variables passed to code that need to know the version number are, in one embodiment, named, for example, 'VER'.

Application Identifier (ID) Definition

The version number may not be enough in some cases to handle all compatibility issues. An application identifier may be included in transactions involving a web server. In one embodiment, a scheme for implementing the application identifier includes a three-character fixed width string that does not include white space characters. For example, in one installation the following is a list of exemplary application identifiers and their definitions, though other identifiers may be used in other installations and embodiments:

a. IAS—iShip Administration Station
b. PSS—Professional Shipping Station (and its variants CMS/UPS).
c. DSS—Desktop Shipping Station
d. API—External used XML based tools
e. IST—iShip Shipping Tools. iShip's free tools on the main iShip web site.
f. NOC—The internal administration tool for power users only.
g. SRF—iShip Shipping Request Form.
h. SQL—Batch applications that run directly in the database. For example a nightly rate update.
i. JOB—Any back-end application that is automated (no user involvement).
j. Arguments and variables passed to code that needs to know the application identifier may be named, for example: 'APP'.

Versioning of Web Content

The versioning of web content allows the hosting of different versions of the same web applications. In one embodiment, an entire web server can be a versioned unit (described more fully below). Assuming that a device terminates the secure socket layer (SSL) or other security or encryption encoding is decoded before an access request arrives at the web servers, a load balancer as such are known in the art can inspect the entire URL that is included in the request and some of the content of the request to make load-balancing decisions, which provides additional flexibility in the embodiments of the invention.

Version Number Imbedded in URLs

In some instances, a means for specifying a version number in a request may be to embed the version number in the web site's path, such as, for example, https://018360.com/pss/002/, where "002" is an exemplary version number. Having a version in the path is likely to be fast for a load balancer. However, a drawback to using versioning in path names is where existing Hyper-Text Markup Language (HTML) coding or other forms of coding contains code relative path references that don't include a version number such an embedded version number scheme may necessitate significant code rewrite. A simple URL re-writing Internet Server API (ISAPI) filter could strip the version number from the URL and put the version in as a customer header. For example in the exemplary URL https://018360.com/pss/002/, this URL would be transformed to https://018360.com/pss/ by the filter, and a custom HTTP header added with the string "002" in it to be interpreted by downstream processes. Unfortunately, code that doesn't have relative paths has to be fixed. For example, the design and research phase for URL versioning would require a careful analysis all URL's being used in currently installed databases. Some URLs may have legacy users on URLs that have not been documented or have been forgotten. Such a situation could adversely impact the initial deployment of the multi-version support.

As a guideline before implementing the embodiments of the present invention in a situation having existing databases, an on-going clean-up effort should be launched to verify that all paths (URLs) where dependent web pages or content have been referenced are relative paths and don't reference a root path. For example <SCRIPT SRC="/lib/user.js"> would be disallowed, instead it should read <SCRIPT SRC="user.js">. Without such references the flexibility to do versioning or other techniques that manipulate the URL like cookie-less session identifier's may be lost.

Another means for identifying a version number in a request is to embed the version number in a query string such as, for example, https://018360.com/pss/default.asp?v=002, where "v=002" is an exemplary specification of the version number to be accessed. However, in some instances, means for identifying the version to be accessed may be specified by a separate beta domain name such as, for example, in this example the exemplary beta domain name of "beta" is used: https://beta.018360.com/pss. This option may be required if the SSL or other encryption technique cannot be terminated before the load balancer.

While version numbers may also be imbedded in a query string such as the one shown above, this is unrealistic where static content is involved. This is because it is not common to add a query string to static content when it is requested. Static content, as used in this context, generally means that a request doesn't need any interpretation on the web server for the content to be returned to the client requesting the file. It is rare to see static content in an HTML web page ever include query strings. This generally breaks the ability to cache these files on the client's computers site, thus introducing inefficiency on subsequent requests for the file.

Another means for specifying the version to be accessed in a request is to put the version number in the domain portion of the URL. This option may be required if the SSL or other encryption technique cannot be terminated before the load balancer. For example, in one embodiment there may be two (2) URLs that are used to switch users to/from at each release such as, for example, https://mbe1.0183601.com, and https://mbe2.018360.com, where "mbe1" and "mbe2" specify the domains of two different releases of the software. However, it is to be appreciated that implementation of this embodiment may require firewall or other protection rules at customer locations to be changed depending on how closely the firewalls scrutinize incoming and outgoing information. Furthermore, URLs that are bookmarked or put on the desktop may be invalidated by the changed version-specific domain URLs.

Version Number Imbedded in a Cookie

In other embodiments, means for specifying the version number of the software is to embed the version number in a "cookie" on the user's browser. A "cookie," as used in this context, refers to a piece of information sent by a web server to a user's browser. Cookies may include information such as, for example, login or registration identification, user preferences, online "shopping cart" information, etc. The browser saves the information, and sends it back to the web server whenever the browser returns to the web site. The web server may use the cookie to, for example, customize the display it sends to the user, or it may keep track of the different pages within the site that the user accesses. Browsers may be configured to alert the user when a cookie is being sent, or to refuse to accept cookies. Some sites, however, cannot be accessed unless the browser accepts cookies. Thus use of cookies does not require any changes in the URLs, thus preserving cached files on the client machine's browser cache. A cookie is automatically sent with every request for any file.

When choosing the particular embodiment of the invention for implementation, performance differences may be found in the load balancer. In some instances inspecting URLs by a load balancer, for example, may be much faster than inspecting the content of a cookie, depending upon the performance characteristics of the load balancer.

Application and System Configuration Data

In order to maintain compatibility, in embodiments of the invention where multiple layers or tiers (e.g., versions) of software are executing simultaneously on one or more associated servers, then software application layers (the tiers) of the invention at all levels ignore and pass on data items that are not recognized. Generally, the applications ignore and pass on values that aren't recognized in a consistent manner. In general, this means that if a configuration item is set to a value that is out of range for the current application layer, then at that layer it should display or be set to some default value for that current application layer, yet the actual value should be preserved and passed on to subsequent layers. Values of input items from the application that are within range of the current application layer, but that are not understood should be flagged as invalid.

In some instances, application and system configuration data may change between versions of the installed software. In such instances, the following guidelines are implemented in order to facilitate the backward compatibility of the software:

a. Semantic Changes To An Existing Data Item
   i. If the semantics of an existing item or items are going to change in the new version, a new version of this data item needs to be added. The versioning scheme is to add a fixed version number to a separate table to allow one or more new data items to be associated with a version number that corresponds to the version number of the software that utilizes the data items.
b. Syntactic Changes To An Existing Data Item
   i. In some cases, a new item doesn't need to be added. For example, in one software version a data item might be allowed to have the values of 1-5. In a new version of the software, 1-6 is allowed, or, perhaps, only 1-4 is allowed in the new version. Both applications (the new one and the older one) may be able to support the new values without change; however, it is to be appreciated that when there is any doubt regarding support of a new data item by earlier software versions, a new data item should be created.

Configuration Items (System Settings)

The ability to have different versions of configuration items with the same name is supported by the embodiments of the current invention. This is implemented through a "SCOPE" field that allows for machine based settings and global settings; however, this field is not flexible enough for versioning. In the embodiments of the present invention, config services settings of the server are modified to support versioning of config items. For example, CONNECTION.WINSOCK.TIMEOUT is used by server processes to set the timeout of network communications of TCP/IP sockets.

The versioning scheme is to add a fixed version number to a separate table to allow one or more config items to be associated with a specific version number. This allows re-use of config items that span multiple versions.

Furthermore, in the embodiments of the present invention, the configuration editor, which is used to changed the configuration of a system in development, is modified to allow for versioning of account configuration items (application settings):

a. Semantics
   i. If the semantics of an existing item are going to change in the new version, a new config item needs to be added or versioned. The versioning scheme is to add a fixed version number and application identifier to a separate table to allow one or more config items to be associated with a specific version number.
b. Syntactic
   i. To support a controlled rollout (for example, a beta test), it may be necessary that beta users be put in their own group or organizational unit so that administrative settings apply only to them and don't hurt the stability of users on the release or earlier version.

Database Structures

Stored Procedures

Data access is generally accomplished through stored procedures in the web applications. To keep the reliability of the system high, methods of data access should be only rarely altered when a new application version is deployed. One technique to support data access when a new application version is deployed is to version the stored procedure that accesses the data by versioning the name of the stored procedure. In the embodiments of the present invention, when necessary, stored procedures for accessing data are versioned by versioning the name(s) of the stored procedures. A version number is appended to an application call string to a store procedure. In one embodiment the version number is a fixed length with zero padded 3-position string such as, for example, dir_sp_FindManifests002, where "002" is the version number, though other forms of versioning using alphanumeric characters, symbols, names, numbers, etc. are contemplated under the embodiments of this invention.

The highest level calling code does not call the versioned name of the stored procedure, rather it passes a version number and an application string to another stored procedure. The stored procedure then appends the application string and the version number and calls the versioned names of the stored procedure similar to a switch statement on the version number as shown in FIG. 6A, and described above.

Stored procedures receive a version number and an application string as input arguments. These arguments, in one embodiment, for example, may be named @VER and @APP. These arguments are generally the first arguments of a stored procedure. The auto-generated stored procedures (e.g., sp_Insert, etc.) are modified to support the version and application string input arguments. Stored procedures that don't receive a value for @VER or @APP have these values set to NULL.

Tables

Generally, tables are not versioned because changes to tables affect all versions of a service that accesses those tables. It is also to be appreciated that in the embodiments of this invention it is not allowable for the semantics of a column in a table to be changed. This means that when a new product version is rolled into production, the database schema upon which all applications reside may be altered. Such alteration is performed in a backwards compatible manner to minimize the effect of any alteration.

Database Columns

Generally, the meaning of a database column should not be altered to support versioning. If the meaning of a database column is altered, in some instances it may result in the breakage or incompatibility of older code and preclude backwards compatibility. A newly allowed value for a column may be acceptable, but must be consistent with older code. If a new value is not acceptable, then downstream code that is older (for example on a batch job or a report), may consider the new value and cause the code to fail because of existing validation rules. Generally, if the semantics need to change in a newer version of code, it is to be appreciated that one option is to create a new database column.

When using multiple versions of the same software as described in the embodiments of the present invention, data auditing, time-stamping and versioning columns should be added to tables and databases that don't already have such standard columns. Although this increases the size of databases and tables, such columns are needed when there are multiple versions of a service running on the same database. Time-stamps should use a consistent basis such as, for example, Universal Coordinated Time (UTC), also known as GMT ("Greenwich Mean Time"). Other suggested columns for shared databases, and exemplary names for such columns, include the following:

ROWSTATUS—in many instances rows (or columns) should not actually be deleted but rather just be marked as deleted or no longer used. This allows for future undelete capability, if needed;

CREATEDATEUTC—a column that provides the date the row was created, for example in GMT time;

CREATEUSERID—a column that provides the user who created the row;

CREATEAPP—a column that provides the name of the application creating the record using the naming conventions defined in the URL rules for versioning found above, this value should also be set by batch applications;

CREATEVER—this column provides a 3-digit version number (string) of the system that created the record;

MODIFIEDDATEUTC—a column that provides the date the row was last updated, for example in GMT time;

MODIFIEDUSERID—a column that provides the user who last updated the row;

MODIFIEDAPP—a column that provides the name of the application modifying the record and should use the naming conventions defined in the URL rules for versioning, above, the value should also be set by batch applications;

MODIFIEDVER—a column that provides the 3 digit version number (string) of the system that modified the record;

LASTACCESSEDDATEUTC—a column that provides the date when a row was last read and, in general, this would be undertaken only as an off-peak activity;

LASTACCESSEDUSERID—a column that provides information about the user who last accessed the row;

LASTACCESSEDAPP—a column that provides the name of the application that last accessed the record and should use the naming conventions defined in the URL rules for versioning, above, this value should also be set by batch applications; and LASTACCESSEDVER—a column that provides the 3 digit version (string) number of the system that last accessed the record.

It is to be appreciated that not all shared databases will incorporate all of the above-identified rows and/or columns and, in some instances, shared databases may not have any of these rows and/or columns.

Views

Similar to stored procedures, view names for displaying content and/or query results are also versioned. A version number is appended to a view's name. The version number is, for example, fixed length with zero padded 3-position string (e.g., PACKAGE002). This allows the calling stored procedure to specify which view is to be used by passing the name of the view along with the version number.

Indexes

If a new version of software requires a new index (or an altered one), applying this new index may have unintended consequences. For instance, the query optimizer running code called from an older version may select the new index being applied, which could result in the old application suddenly (in a particular functional area) becoming slow and inefficient. Therefore, generally, any index changes should be tested against all older product versions in production. Furthermore, the general case is that indexes are not to be versioned.

Triggers

If software triggers are used in the original or earlier-versioned software, their effect and function needs to be considered in the current versioning system. Generally, this will need to be performed on a case-by-case basis.

Jobs

Jobs such as, for example, batch applications, should be backwards compatible. Consideration should be given to the previous versions of the data that are being processed by the jobs as well as the newer-versioned data that will be processed.

Message Queue

Generally, message queues are used for inter-process communication or for server-to-server communication. Such queues are used for messaging, the passing of control or of content.

Queue Names

Generally, the names of message queues should not be altered to handle different versions of the same message unless the risk associated with the deploying a new reader process is too great. In this case a new queue name having an appended version number should be used. In one embodiment the version number is, for example, fixed length with zero padded 3-position string such as, for example, MANFIES-QUEUE003, where "003" is the version number of the queue. In instances where a completely new object type is being supported in the revised software, then a new queue should be created. Furthermore, if queue properties are changed, then a new queue should be considered rather than modifying an existing queue.

Messages

A version number is added to all messages so that such messages will be directed to their proper queues if there are queues specific to the new version; otherwise if there is no version-specific queue, the message is sent to its original queue.

Queue Readers

A queue reader should be backwards compatible in that it must be able to handle older formatted messages read from a queue. A message read from a queue without a version number is generally assumed to have been generated from legacy (older) code.

Queue Writers

Computer code that is writing or sending outputs to a queue should include a version number in the message or message attributes so that such information will be directed to the proper queue, if versioned queues are employed. If a version number is omitted, the message will be assumed to have been generated from the legacy code and sent to the original (legacy) queue.

Web Server

Referring back to FIG. 5, a web server 506 as used in an embodiment of the present invention may be versioned as an entire unit, meaning that there is only one version of a particular application hosted on a web server. While there may be a temptation to put two (2) versions of the same application in the case that no dynamic link library (DLL) or other component is being changed, this should be avoided as the web server 506 may be destabilized. Additionally, when deploying new software, greater flexibility for making revisions is provided if an entire web server 506 is being used for the new version.

Application Server

Generally, application servers 508 are to remain backwards compatible when multiple versions of software are in use. However, in other embodiments where an application server 508 is not backwards compatible, a request to the application server 508 is redirected to a server executing an appropriate version of the (requested) code, similar to the process described for a web server 506, above. As shown in FIG. 5, an application server 508, in one embodiment, may be simultaneously executing old and new versions of software. If a version number is presented in a URL from a web server 506 to the application server 508, then it is possible to load balance the request to a compatible application server. In some instances report servers act as application servers and URL-based request from a web server are routed through the load balancer to the appropriate version report server. Prior-version report servers are maintained to remain compatible with previous versions of reports.

Job Server

Job servers also should remain backwards compatible when multiple versions of software are available. However, it may be that the risk is too high to upgrade all job servers when a new application version is rolling out. Therefore, in such high-risk instances, if a job is reading a queue, then the queue name should be versioned as described above.

Hardware

Hardware upgrades are to remain backwards compatible including changes/upgrades to operating systems (O/S). O/S upgrades should be first tested in a staging environment before active implementation, this includes the O/S that reside in switches, routers, etc.

Component Dlls

Generally, interfaces will not use the mechanism built into Microsoft COM for versioning (i.e., PROGID's).

—More Detail—

FIG. 7 is a flowchart of a process of for controlled deployment of software in a web-based Internet environment in an embodiment of the invention. The process begins at Step 700. At Step 702, a user accesses and logs on to a web page over the Internet and using a common browser. At Step 704, based on information about the user, a decision is made as to which group the user belongs, for example, the decision may be whether the user belongs to a group selected for accessing a new version of software. The information by the user may be supplied in numerous ways such as, for example, unique logon information supplied at the web page level, a pre-set cookie as are known in the art, an IP address, the specific URL address used to access the web page, etc. At Step 704, if the user is determined to be in a new software deployment group, then the process continues to Step 706. At Step 706, a decision is made whether the new version of software is optional. In other words, it is determined whether the user is one that has been pre-designated as having an option of accessing a new version of the software or accessing a prior version. If, at Step 706, it is determined that the user is one that has an option to access a new version of software, then the process moves on to Step 708. At Step 708, a decision is made as to whether the user accepts the new version of software. If, at Step 708, the user does accept the new version of software, then at Step 710 a new URL is built for that user wherein the new URL contains the version number of the software that the user may access, which will generally be the latest version, and at Step 712 the user accesses the designated version of the software (as determined in Step 710) as it operates on the web server. If, at Step 704 it is determined that user is not in the new software deployment group, then at Step 714 a new URL is built for that user wherein the new URL contains the version number of the software that the user may access, which will generally be an older version number or a version that is different from the one described in Step 710. The process then continues to Step 712 where the user then accesses the designated version of the software (as determined in Step 714) as it operates on the web server. If at Step 706 it is determined that the user does not have an option to access a newer version of the software, then the process continues at Step 710. If at Step 708 the user does not accept the newer version of software, then the process continues at Step 714. The process ends at Step 716.

FIG. 8 is an exemplary system for implementing an embodiment of the invention that illustrates the inventive concepts of backwards compatibility and data item opaqueness. In FIG. 8, three computing devices 802, 804, 806 operating web browsers access a data center 808 via a network 810. The computing devices are each authorized to access a different version of the same software that is operating on the servers of the data center. For instance, computing device 802 has access to version 001 of the software, computing device 804 has access to version 002 of the software and computing device 806 has access to version 003 of the software. Because each computing device is accessing a different version of the same software, the software (and system) is "backwards compatible" in that the older versions operate concurrently with newer versions of the same software. Likewise, variables or data items 812 may not be recognized by some tiers of software 814, 816, 818 that are accessed by the computing devices or called by other software accessed by the computing devices. In such instances, the software tiers do not reject unrecognized software but pass along such unknown variables 820, 822 to the next tier.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed in a generic and descriptive sense only and not for purposes of limitation.

That which is claimed:

1. A system for controlling the deployment of software in a multiple version environment, said system comprised of:
   one or more servers comprising a respective processor configured to simultaneously execute at least a first and a second version of a particular software application stored in a respective memory of said one or more servers;

one or more user terminals comprising a respective processor configured to access the one or more servers over a network, wherein said respective processor of said one or more user terminals is configured to generate a request to access said particular software application from at least one of said one or more user terminals by including in said request an identifier indicating the version of the particular software application to be accessed, wherein said identifier is specified by indicating a version number in one or more of a said request, wherein the version number is included in:
   a path in a URL included in the request;
   a query string in a URL included in the request;
   separate domain names in a URL included in the request;
   a domain name in a URL included in the request;
   a cookie in a browser that originated the request; and
a device comprising a processor configured to route said request to the version of the particular software application to be accessed.

2. The system of claim 1, wherein the device for routing the request to the version of the particular software application to be accessed is a switch.

3. The system of claim 1, wherein the device for routing the request to the version of the particular software application to be accessed is a translator that translates the request to a format acceptable to the version of the software to be accessed.

4. The system of claim 1, wherein the network is an Internet connection and the particular software application is a carrier management system.

5. A system for controlling the deployment of software in a multiple version environment, said system comprised of:
   one or more sewers comprising a respective processor configured to simultaneously execute at least a first and a second version of a particular software application stored in a respective memory of said one or more servers;
   one or more user terminals comprising a respective processor configured to access the one or more servers over a network, wherein said respective processor of at least one of said one or more user terminals is configured to generate a request to access said particular software application and the version of the particular software application to be accessed is identified by indicating a version number in one or more of a said request, wherein the version number is included in:
   a path in a URL included in the request;
   a query string in a URL included in the request;
   separate domain names in a URL included in the request;
   a domain name in a URL included in the request;
   a cookie in a browser that originated the request; and
   means for routing said request to the version of the particular software application to be accessed.

6. The system of claim 5, wherein the network is an Internet connection and the particular software application is a carrier management system.

7. A system for simultaneously executing multiple tiers of software in a multiple version environment, said system comprised of:
   one or more sewers comprising a respective processor configured to simultaneously execute at least first and second versions of a particular software application stored in a respective memory of said one or more servers, wherein the at least first and second version of the particular software application comprise the multiple tiers of software;
   one or more user terminals comprising a respective processor configured to access the one or more servers over a network, wherein said respective processor of at least one of said one or more user terminals is configured to generate a request to access said particular software application by including in said request an identifier indicating the version of the particular software application to be accessed, wherein said identifier is specified by indicating a version number in one or more of a said request, wherein the version number is included in:
   a path in a URL included in the request;
   a query string in a URL included in the request;
   separate domain names in a URL included in the request;
   a domain name in a URL included in the request;
   a cookie in a browser that originated the request; and
   a device comprising a processor configured to route said request to the version of the particular software application to be accessed, wherein said variables, data items, or arguments of said request are passed from a tier of software where they are not recognized to a tier of software where said variables, data items, or arguments are recognized by the version of the particular software application executing at that tier of software.

8. The system of claim 7, wherein the device for routing the request to the version of the particular software application to be accessed is a switch.

9. The system of claim 7, wherein the device for routing the request to the version of the particular software application to be accessed is a translator that translates the request to a format acceptable to the version of the software to be accessed.

10. The system of claim 7, wherein the network is an Internet connection and the particular software application is a carrier management system.

11. A method of controlling the deployment of software in a multiple version environment comprising:
   simultaneously executing at least a first and a second version of a particular software application using a respective processor of one or more servers;
   receiving logon information from a user terminal wherein a user logs onto a website using said user terminal using said logon information;
   determining from said logon information a designated version of said particular software application for said user, wherein said designated version of the particular software application is the version of said particular software application that said user is authorized to access;
   making a request from said user terminal over a network to said one or more servers to access the designated version of software, wherein said request identifies the designated version of the particular software application to be accessed, wherein making the request from said user terminal over a network to said one or more servers to access the designated version of software that identifies the designated version of the particular software application to be accessed comprises identifying the particular software application by indicating a version number in one or more of a said request, wherein the version number is included in:
   a path in a URL included in the request;
   a query string in a URL included in the request;
   separate domain names in a URL included in the request;

a domain name in a URL included in the request;
a cookie in a browser that originated the request; and
accessing said designated version of the particular software application.

12. The method of claim 11, wherein accessing said designated version of the particular software application comprises routing the request to the designated version of the software application to be accessed by a switch.

13. The method of claim 11, wherein accessing said designated version of the particular software application comprises routing the request to a translator that translates the request to a format acceptable to the designated version of the software to be accessed.

14. The method of claim 11, wherein making a request from said user terminal over a network to said one or more servers to access the designated version of software the request is made via an Internet connection and the designated version of software is a specific release version of a carrier management system.

15. A method for simultaneously executing multiple tiers of software in a multiple version environment comprising the steps of:
simultaneously executing at least a first and a second version of a particular software application using a processor of one or more servers, wherein the at least first and second version of the particular software application comprise the multiple tiers of software;
accessing the one or more servers over a network using one or more user terminals;
making a request comprised of at least one of variables, data items or arguments is made to access said particular software application from at least one of said one or more user terminals, wherein said request identifies the version of the particular software application to be accessed, wherein making said request comprised of at least one of variables, data items or arguments is made to access said particular software application from at least one of said one or more user terminals and said request identifies the version of the particular software application to be accessed identifies the version of the particular software application to be accessed by indicating a version number in one or more of a said request, wherein the version number is included in:
a path in a URL included in the request;
a query string in a URL included in the request;
separate domain names in a URL included in the request;
a domain name in a URL included in the request;
a cookie in a browser that originated the request; and
routing said request to the version of the particular software application to be accessed, wherein said variables, data items, or arguments of said request are passed from a tier of software where they are not recognized to a tier of software where said variables, data items, or arguments are recognized by the version of the particular software application executing at that tier of software.

16. The method of claim 15, wherein routing said request to the version of the particular software application to be accessed comprises routing the request to a switch that routes said request to the version of the particular software application to be accessed.

17. The method of claim 15, wherein routing said request to the version of the particular software application to be accessed comprises routing the request to a translator that translates the request to a format acceptable to the version of the software to be accessed.

18. The method of claim 15, wherein providing one or more user terminals that access the one or more servers over a network is accomplished over an Internet connection and the particular software application is a carrier management system.

* * * * *

UNITED STATES PATENT AND TRADEMARK OFFICE
CERTIFICATE OF CORRECTION

PATENT NO. : 7,562,358 B2
APPLICATION NO. : 11/238423
DATED : July 14, 2009
INVENTOR(S) : Bennett et al.

It is certified that error appears in the above-identified patent and that said Letters Patent is hereby corrected as shown below:

Column 4,

Line 16, after "process" delete "of".

Column 18,

Line 56, after "employed" insert --herein, they are used--.

Column 19,

Lines 35 and 64, "sewers" should read --servers--.

Signed and Sealed this

Fifteenth Day of December, 2009

David J. Kappos
*Director of the United States Patent and Trademark Office*